United States Patent
Horng

(10) Patent No.: US 8,946,961 B2
(45) Date of Patent: Feb. 3, 2015

(54) MOTOR WITH POWER-GENERATING COIL SET

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 399 days.

(21) Appl. No.: 13/542,870

(22) Filed: Jul. 6, 2012

(65) Prior Publication Data

US 2013/0193793 A1 Aug. 1, 2013

(30) Foreign Application Priority Data

Jan. 31, 2012 (TW) .............................. 101103039 A

(51) Int. Cl.
- *H02K 21/24* (2006.01)
- *H02K 21/00* (2006.01)
- *H02K 29/00* (2006.01)

(52) U.S. Cl.
USPC ...................... 310/113; 310/67 R; 310/156.32

(58) Field of Classification Search
USPC .................................. 310/67 R, 113, 156.32
See application file for complete search history.

(56) References Cited

U.S. PATENT DOCUMENTS

| | | | |
|---|---|---|---|
| 2,778,960 A | | 1/1957 | Anderson |
| 2,970,238 A | | 1/1961 | Swiggett |
| 4,594,524 A | * | 6/1986 | Sudo ............................ 310/68 R |
| 7,161,256 B2 | * | 1/2007 | Fang .............................. 290/1 R |
| 8,710,709 B2 | * | 4/2014 | Horng ............................ 310/113 |
| 2010/0289368 A1 | | 11/2010 | Caputi |

FOREIGN PATENT DOCUMENTS

| | | | | |
|---|---|---|---|---|
| JP | 54-072407 | * | 6/1979 | ............. H02K 21/12 |
| TW | M382655 | | 6/2010 | |
| TW | I347166 | | 8/2011 | |

* cited by examiner

*Primary Examiner* — Burton Mullins

(74) *Attorney, Agent, or Firm* — Alan D. Kamrath; Kamrath IP Lawfirm, P.A.

(57) ABSTRACT

A motor with power-generating coil set including a base, a rotor, a driving circuit and a power-storing unit is disclosed. The base has a shaft coupling portion and a supporting surface, wherein the supporting surface surrounds the shaft coupling portion, and a driving coil set and a power-generating coil set are disposed above the supporting surface. The rotor has a carrier, a shaft and a magnetic member, wherein the carrier has a coupling surface, the shaft rotatably couples with the shaft coupling portion of the base, and the magnetic member is mounted on the coupling surface and has a magnetic face facing the driving coil set and the power-generating coil set. The driving circuit electrically connects with and sends a driving signal to the driving coil set. The power-storing unit electrically connects with and stores electric power generated by the power-generating coil set.

8 Claims, 5 Drawing Sheets

MOTOR WITH POWER-GENERATING COIL SET

BACKGROUND OF THE INVENTION

1. Field of the Invention

The present invention relates to a motor with power-generating coil set and, more particularly, to a motor having a thin structure.

2. Description of the Related Art

Referring to FIG. 1, an invention of a Taiwan patent with patent number I347166 and entitled as "Cooling Fan" is shown and regards to a cooling fan including a base 91, a fan wheel 92, a driving unit 93 and a power-generating unit 94. The base 91 has a shaft tube 911. The fan wheel 92 is rotatably coupled with the shaft tube 911 and has a carrier 921, with an end edge of the carrier 921 extending towards the base 91 to form an annular wall 922. The driving unit 93 includes a first magnet ring 931 and a first coil 932, wherein the first magnet ring 931 is mounted on an inner surface of the annular wall 922, the first coil 932 surrounds the shaft tube 911, and there is a first air gap "A1" between the first magnet ring 931 and the first coil 932. The power-generating unit 94 includes a second magnet ring 941 and a second coil 942, wherein the second magnet ring 941 is mounted on the shaft tube 911 and adjacent to the carrier 921, the second coil 942 is mounted on an lower surface of the carrier 921, and there is a second air gap "A2" between the second magnet ring 941 and the second coil 942.

When the cooling fan runs, the first coil 932 is electrically energized to generate an alternating magnetic field so as to drive the first magnet ring 931, and thus the fan wheel 92 turns. At the same time, the second coil 942 is moved relatively to the second magnet ring 941 by the rotation of the fan wheel 92, and thus the second coil 942 generates an induced current by the magnetic field of the second magnet ring 941 due to flux linkage.

However, in order to serve as a motor and a power generator simultaneously, in comparison with other fans, this conventional cooling fan has not only the driving unit 93 but also the power-generating unit 94. Therefore, an axial length of the cooling fan includes not only the axial width of the first air gap "A1" but also the axial width of the second air gap "A2." Specifically, since the first air gap "A1" and second air gap "A2" are arranged in different axial positions of the cooling fan, this cooling fan is axially thicker than other fans not providing a power-generating function owing to the additional second air gap "A2". Similarly, because the first magnet ring 931 and first coil 932 for fan driving and the second magnet ring 941 and second coil 942 for power generation are arranged in stagger axially, this conventional cooling fan is thus complex in structure and it is impossible to further reduce its axial size.

SUMMARY OF THE INVENTION

It is therefore the primary objective of this invention to provide a motor with power-generating coil set, and the motor is capable of rotational driving and power generation while having a thin structure, that is, being small in an axial direction of the motor.

Another objective of this invention is to provide a motor with power-generating coil set, which has a simple structure capable of rotational driving and power generation.

The invention discloses a motor with power-generating coil set including a base, a rotor, a driving circuit and a power-storing unit. The base has a shaft coupling portion and a supporting surface, wherein the supporting surface surrounds the shaft coupling portion, and a driving coil set and a power-generating coil set are disposed above the supporting surface. The rotor has a carrier, a shaft and a magnetic member, wherein the carrier has a coupling surface, the shaft rotatably couples with the shaft coupling portion of the base, and the magnetic member is mounted on the coupling surface and has a magnetic face facing the driving coil set and the power-generating coil set. The driving circuit electrically connects with the driving coil set for sending a driving signal to the driving coil set. The power-storing unit electrically connects with the power-generating coil set for storing electric power generated by the power-generating coil set.

The invention further discloses that the driving coil set and the power-generating coil set axially extend in one height range.

The invention further discloses that a first air gap is formed between the driving coil set and the magnetic member, a second air gap is formed between the power-generating coil set and the magnetic member, and the first air gap partially overlaps the second air gap in an axial direction of the rotor.

The invention further discloses that a radial distance between the driving coil set and the shaft coupling portion is shorter than another radial distance between the power-generating coil set and the shaft coupling portion.

The invention further discloses that a radial distance between the power-generating coil set and the shaft coupling portion is shorter than another radial distance between the driving coil set and the shaft coupling portion.

The invention further discloses that a radial distance between the driving coil set and the shaft coupling portion is equal to another radial distance between the power-generating coil set and the shaft coupling portion, with coils of the driving coil set and coils of the power-generating coil set surrounding the shaft coupling portion in a stagger way.

The invention further discloses that, in radial directions of the rotor, a distributed area of the magnetic face of the magnetic member totally covers distributed areas of the driving coil set and the power-generating coil set.

The invention further discloses that coils of the driving coil set and power-generating coil set are coil circuits formed on a board by circuit-printing or electroforming, and the driving coil set and power-generating coil set are disposed above the supporting surface through the board.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
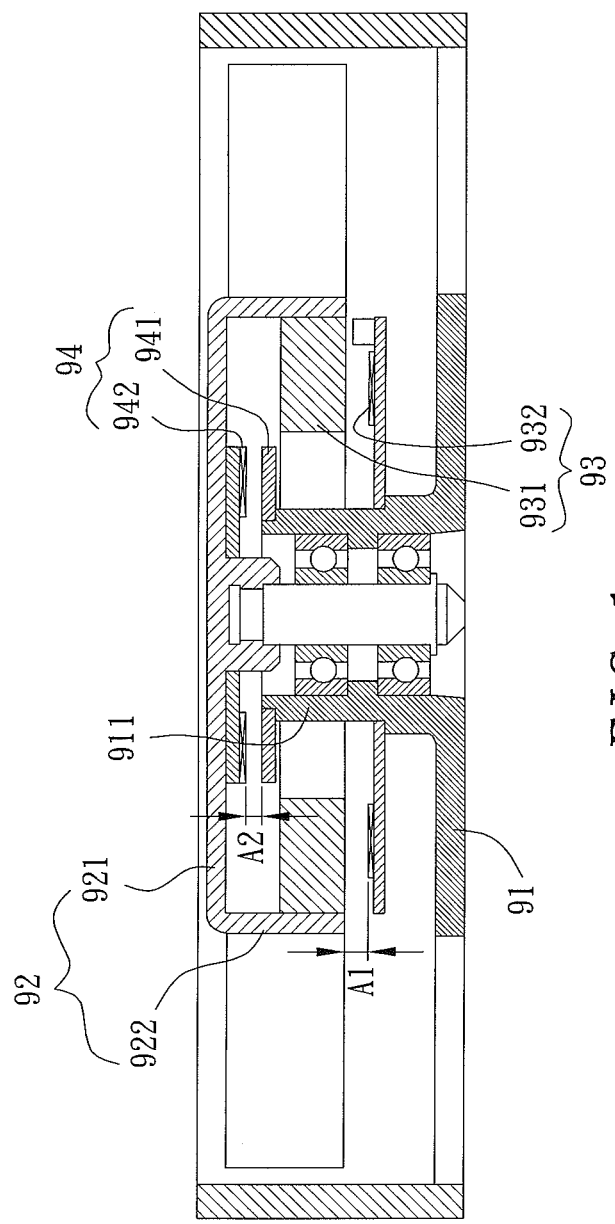
FIG. 1 shows a cross-sectional view of a conventional cooling fan.
Figure 2:
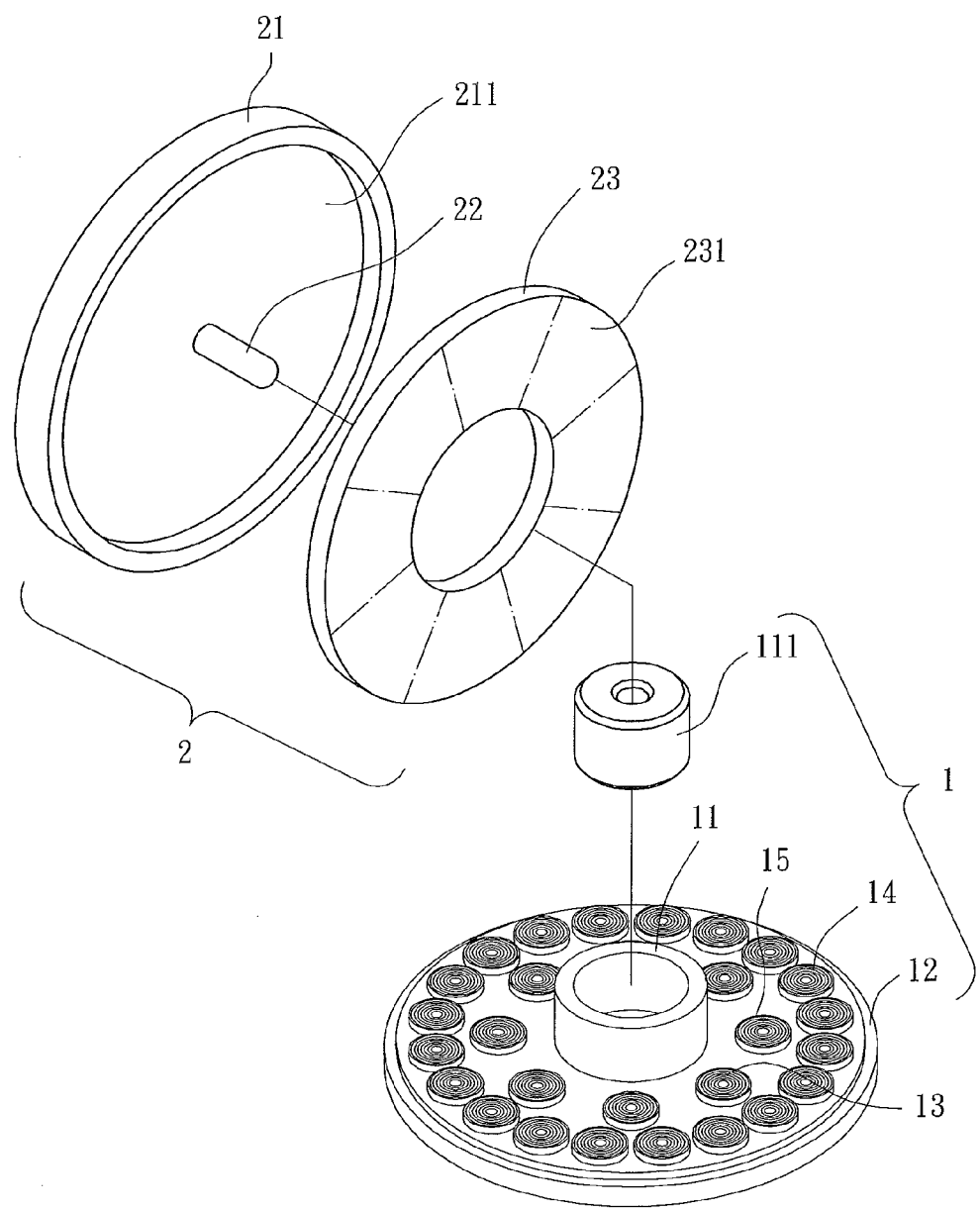
FIG. 2 shows a perspective and exploded view of a motor with power-generating coil set according to a preferable embodiment of the invention.
Figure 3:
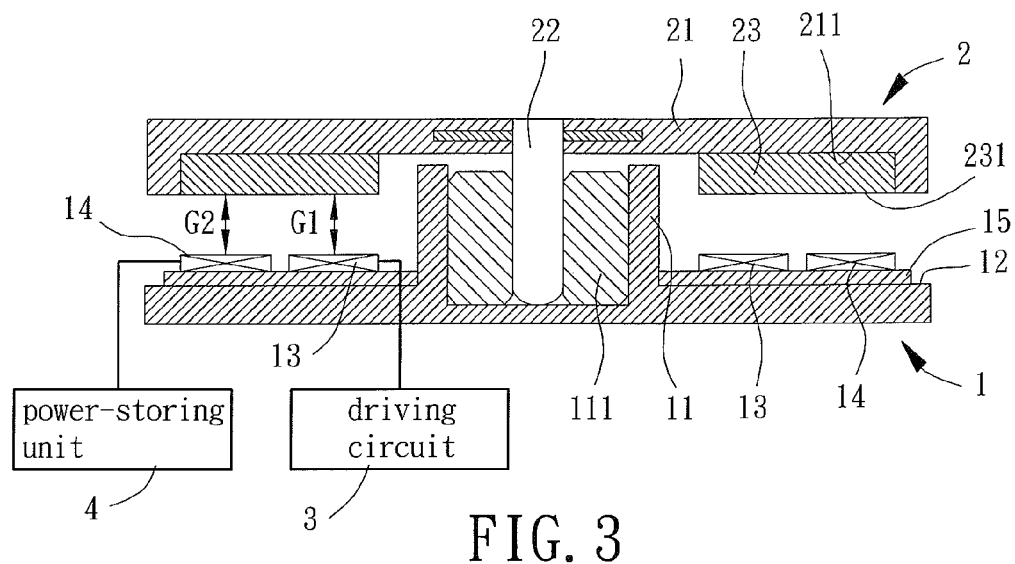
FIG. 3 shows a cross-sectional view of the motor according to a preferable embodiment of the invention.

FIGS. 2 and 3 show a motor with a power-generating coil set according to a preferable embodiment of the invention. The motor with a power-generating coil set includes a base 1, a rotor 2, a driving circuit 3 and a power-storing unit 4, wherein the rotor 2 is rotatably mounted on the base 1, the driving circuit 3 electrically connects with the base 1 and generates a driving signal to turn the rotor 2 through the base 1, and the power-storing unit 4 electrically connects with the base 1 and stores the electric power generated by the turning rotor 2.

Figure 4:
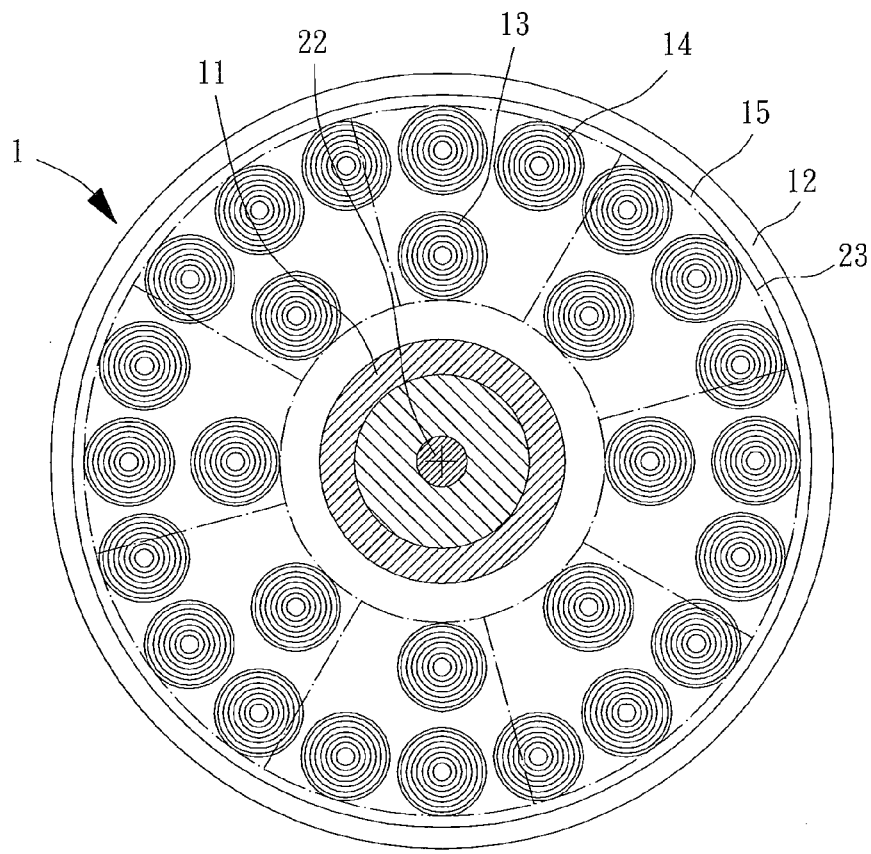
FIG. 4 shows a top view of an arrangement of a driving coil set and a power-generating coil set of the motor according to the preferable embodiment.
Figure 5:
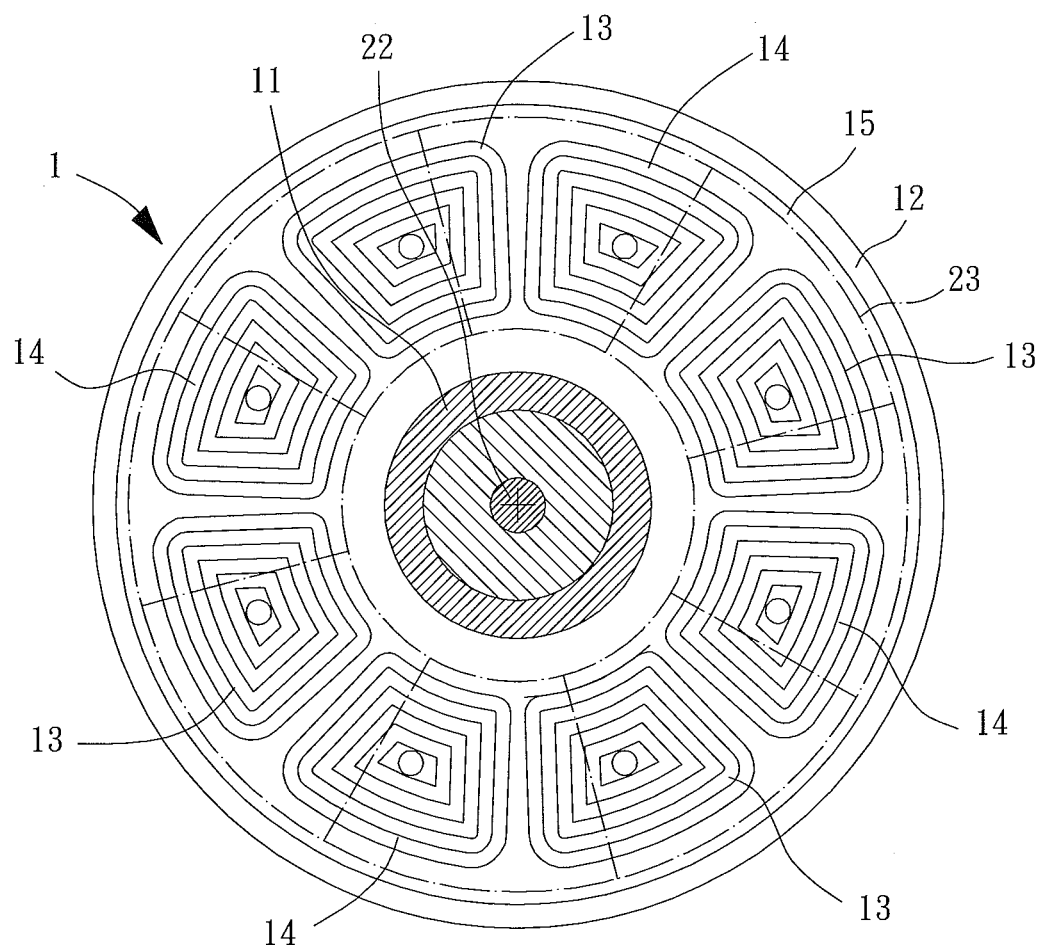
FIG. 5 shows a top view of another arrangement of the driving coil set and the power-generating coil set of the motor according to the preferable embodiment.

The base 1 includes a shaft coupling portion 11, a supporting surface 12, a driving coil set 13 and a power-generating coil set 14. The shaft coupling portion 11 receives a bearing 111. The supporting surface 12 surrounds the shaft coupling portion 11. The driving coil set 13 and the power-generating coil set 14 are disposed above the supporting surface 12 and surround the shaft coupling portion 11 respectively. Preferably, the driving coil set 13 and the power-generating coil set 14 axially extend in one height range; that is, the axial positions of the driving coil set 13 and the power-generating coil set 14 are identical relative to the supporting surface 12. Specifically, the arrangement of the driving coil set 13 and power-generating coil set 14 can be adjusted according to needs. For example, referring to FIG. 4, a radial distance between the driving coil set 13 and the shaft coupling portion 11 is shorter than another redial distance between the power-generating coil set 14 and the shaft coupling portion 11, so that a distributed area of the power-generating coil set 14 on the supporting surface 12 is larger than that of the driving coil set 13. Alternatively, the positions of the driving coil set 13 and power-generating coil set 14 can be reverse, and thus the shaft coupling portion 11 is closer to the power-generating coil set 14 than to the driving coil set 13, so that the distributed area of the driving coil set 13 on the supporting surface 12 is larger than that of the power-generating coil set 14 in this arrangement. Otherwise, referring to FIG. 5, the coils of the driving coil set 13 and the coils of the power-generating coil set 14 may be arranged in a stagger way circumferentially, with the radial distance between the driving coil set 13 and the shaft coupling portion 11 being equal to that between the power-generating coil set 14 and the shaft coupling portion 11. Moreover, the coils of the driving coil set 13 and power-generating coil set 14 may be coil circuits that are formed on a board 15 by circuit-printing or electroforming while the board 15 is mounted on the supporting surface 12 for the driving coil set 13 and power-generating coil set 14 to be disposed above the supporting surface 12 through the board 15. However, the driving coil set 13 and power-generating coil set 14 can also be formed by wound wires and directly mounted on the supporting surface 12.

The rotor 2 includes a carrier 21, a shaft 22 and a magnetic member 23. The carrier 21 has a coupling surface 211 facing the supporting surface 12 of the base 1. The shaft 22 protrudes from the coupling surface 211 of the carrier 21 and rotatably couples with the shaft coupling portion 11 such as coupling with the bearing 111 inside the shaft coupling portion 11, so that the rotor 2 may rotate relatively to the base 1. The magnetic member 23 is mounted on the coupling surface 211 of the carrier 21 and has a magnetic face 231 facing the driving coil set 13 and the power-generating coil set 14 above the supporting surface 12. Specifically, the magnetic member 23 is preferably made of a magnet, such as a magnet ring having N and S poles arranged in a stagger way circumferentially. Preferably, in radial directions of the rotor 2, a distributed area of the magnetic face 231 of the magnetic member 23 totally covers the distributed areas of the driving coil set 13 and the power-generating coil set 14.

The driving circuit 3 electrically connects with the driving coil set 13 and the power-storing unit 4 electrically connects with the power-generating coil set 14 as shown in FIG. 3. Therefore, referring to FIG. 4 again, the power-generating coil set 14 can generate much more electric power when the power-generating coil set 14 surrounds the driving coil set 13 to have its distributed area larger than that of the driving coil set 13. Alternatively, the driving coil set 13 can provide a much more powerful alternating magnetic field by the driving signal of the driving circuit 3 when the driving coil set 13 surrounds the power-generating coil set 14 to have its distributed area larger than that of the power-generating coil set 14. Furthermore, referring to FIG. 5 again, the present motor may have driving and power-generating functions without increasing the radial size thereof when the coils of the driving coil set 13 and the coils of the power-generating coil set 14 are circumferentially arranged in the stagger way.

When the motor of the present invention is driven, the driving circuit 3 outputs the driving signal for the driving coil set 13 to generate the alternating magnetic field so as to turn the rotor 2 through the magnetic member 23. At the same time, the magnetic member 23 is moved relatively to the power-generating coil set 14 by the rotation of the rotor 2, and thus the power-generating coil set 14 generates an induced current by the magnetic field of the magnetic member 23 due to flux linkage. Finally, the power-storing unit 4 may store the electric power of the induced current provided by the power-generating coil set 14.

Figure 6:
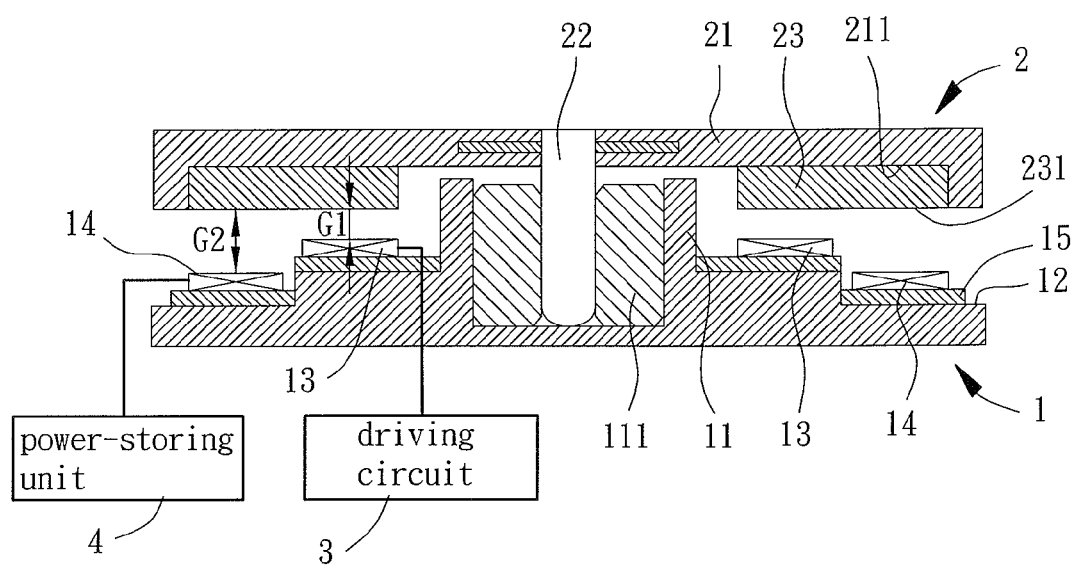
FIG. 6 shows a cross-sectional view of the motor according to the preferable embodiment, with widths of air gaps respectively corresponding to the driving coil set and the power-generating coil set being different.

Particularly, the character of the motor of this invention lies in that, referring to FIG. 3, although there are driving coil set 13 and power-generating coil set 14 respectively arranged in the motor, the axial thickness of this motor does not increase since the driving and power-generating coil sets 13, 14 are disposed in the same axial position while a first air gap "G1" between the driving coil set 13 and the magnetic member 23 totally overlaps a second air gap "G2" between the power-generating coil set 14 and the magnetic member 23 in the axial direction of the rotor 2. Alternatively, referring to FIG. 6, the axial positions of the driving coil set 13 and power-generating coil set 14 may be different and thus the first air gap "G1" overlaps the second air gap "G2" partially for certain purposes such as preventing the reacting force during power generation from largely affecting the rotation of the rotor 2 while the power-generating coil set 14 is farther to the magnetic member 23 than the driving coil set 13 to the magnetic member 23. Furthermore, since both of the driving coil set 13 and the power-generating coil set 14 face the magnetic face 231 of the magnetic member 23, the motor of the present invention have not to additionally include any other magnet for power generation, and thus this motor can have a simple and thin structure.

Although the invention has been described in detail with reference to its presently preferable embodiment, it will be understood by one of ordinary skill in the art that various modifications can be made without departing from the spirit and the scope of the invention, as set forth in the appended claims.

What is claimed is:
1. A motor with power-generating coil set, comprising:
   a base having a shaft coupling portion and a supporting surface, wherein the supporting surface surrounds the shaft coupling portion, and a driving coil set and a power-generating coil set are disposed above the supporting surface;

a rotor having a carrier, a shaft and a magnetic member, wherein the carrier has a coupling surface, the shaft rotatably couples with the shaft coupling portion of the base, and the magnetic member is mounted on the coupling surface and has a magnetic face facing the driving coil set and the power-generating coil set;

a driving circuit electrically connecting with the driving coil set for sending a driving signal to the driving coil set; and a power-storing unit electrically connecting with the power-generating coil set for storing electric power generated by the power-generating coil set.

2. The motor with power-generating coil set as claimed in claim 1, wherein the driving coil set and the power-generating coil set axially extend in one height range.

3. The motor with power-generating coil set as claimed in claim 1, wherein a first air gap is formed between the driving coil set and the magnetic member, a second air gap is formed between the power-generating coil set and the magnetic member, and the first air gap partially overlaps the second air gap in an axial direction of the rotor.

4. The motor with power-generating coil set as claimed in claim 1, wherein a radial distance between the driving coil set and the shaft coupling portion is shorter than another radial distance between the power-generating coil set and the shaft coupling portion.

5. The motor with power-generating coil set as claimed in claim 1, wherein a radial distance between the power-generating coil set and the shaft coupling portion is shorter than another radial distance between the driving coil set and the shaft coupling portion.

6. The motor with power-generating coil set as claimed in claim 1, wherein a radial distance between the driving coil set and the shaft coupling portion equals to another radial distance between the power-generating coil set and the shaft coupling portion, with coils of the driving coil set and coils of the power-generating coil set surrounding the shaft coupling portion in a stagger way.

7. The motor with power-generating coil set as claimed in claim 1, wherein, in radial directions of the rotor, a distributed area of the magnetic face of the magnetic member totally covers distributed areas of the driving coil set and the power-generating coil set.

8. The motor with power-generating coil set as claimed in claim 1, wherein coils of the driving coil set and power-generating coil set are coil circuits formed on a board by circuit-printing or electroforming, and the driving coil set and power-generating coil set are disposed above the supporting surface through the board.

* * * * *